United States Patent [19]

Shank

[11] Patent Number: 4,653,590

[45] Date of Patent: Mar. 31, 1987

[54] EDGER AND BLADE THEREFOR

[76] Inventor: James Shank, Sea Glades Motel, 1223 NE. 1st Ave., Florida City, Fla. 33034

[21] Appl. No.: 666,424

[22] Filed: Oct. 30, 1984

[51] Int. Cl.$^4$ .............................................. A01D 34/84
[52] U.S. Cl. ........................................ 172/15; 56/256; 30/265
[58] Field of Search ................................ 172/13–17, 172/555, 1; 56/295, 256, 17.5; 30/DIG. 5, 265

[56] References Cited

U.S. PATENT DOCUMENTS

| | | | |
|---|---|---|---|
| 1,006,758 | 10/1911 | Karass. | |
| 1,721,661 | 7/1929 | Hawney. | |
| 2,312,569 | 3/1943 | Maga | 172/15 |
| 2,475,716 | 7/1949 | Nabors | 56/295 |
| 2,630,747 | 3/1953 | Mintz | 97/227 |
| 2,651,530 | 9/1953 | Blydenberg | 56/295 |
| 2,680,945 | 6/1954 | Reed | 56/25.4 |
| 2,718,838 | 9/1955 | Schumacher | 97/227 |
| 2,913,058 | 11/1959 | Smith et al. | 172/15 |
| 2,976,666 | 3/1961 | Machovec | 56/295 |
| 3,057,411 | 9/1962 | Carlton | 172/17 |
| 3,070,176 | 12/1962 | Thrasher | 172/16 |
| 3,192,693 | 7/1965 | Bergeson | 56/25.4 |
| 3,217,812 | 11/1965 | Gallion | 172/16 |
| 3,496,707 | 2/1970 | Kobey | 56/17.5 |
| 3,656,554 | 4/1972 | Buhner | 172/14 |
| 3,734,196 | 5/1973 | Mangum | 172/16 |
| 4,002,205 | 1/1977 | Falk | 172/15 |
| 4,072,195 | 2/1978 | Carlson | 172/15 |

FOREIGN PATENT DOCUMENTS

| | | | |
|---|---|---|---|
| 474708 | 7/1975 | Australia | 56/295 |
| 2817012 | 10/1979 | Fed. Rep. of Germany | 56/295 |
| 2061687 | 5/1981 | United Kingdom | 56/295 |

Primary Examiner—Richard J. Johnson
Attorney, Agent, or Firm—Lowe, Price, LeBlanc, Becker & Shur

[57] ABSTRACT

An edger for cutting a furrow between a sidewalk edge and adjacent soil includes first and second blades fixedly mounted on a horizontally extending motor driven shaft. The first blade includes a pair of elongated soil cutting arms extending oppositely from a central portion fixedly mounted on the shaft. The second blade includes a central portion fixedly mounted on the shaft and a pair of elongated arms crossed with respect to the arms of the first blade. Each of the arms of the second blade includes an outer planar portion and an intermediate inclined portion on which the outer portion is mounted so that the outer portion is in a plane substantially parallel to and removed from a plane containing the segment of the center portion which intersects the and is at right angles to the shaft axis. Each outer planar portion has a longitudinal edge including a beveled longitudinal soil cutting surface, which in combination with soil cutting surfaces of the first blade forms the furrow. Each of the outer portions of the second blade includes a longitudinally extending channel which defines a groove for lifting and turning soil cut from the furrow by the blade as the shaft turns.

10 Claims, 5 Drawing Figures

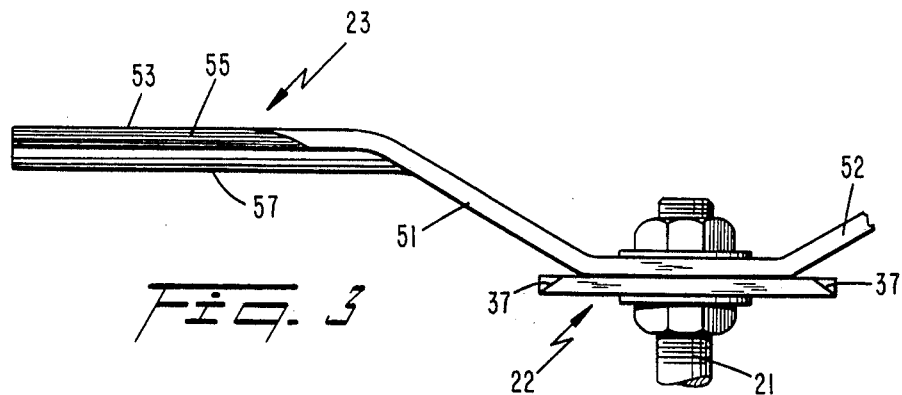
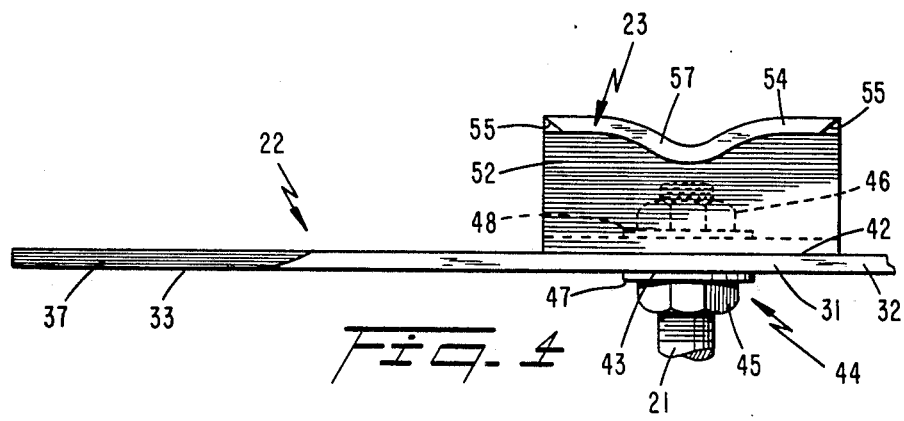
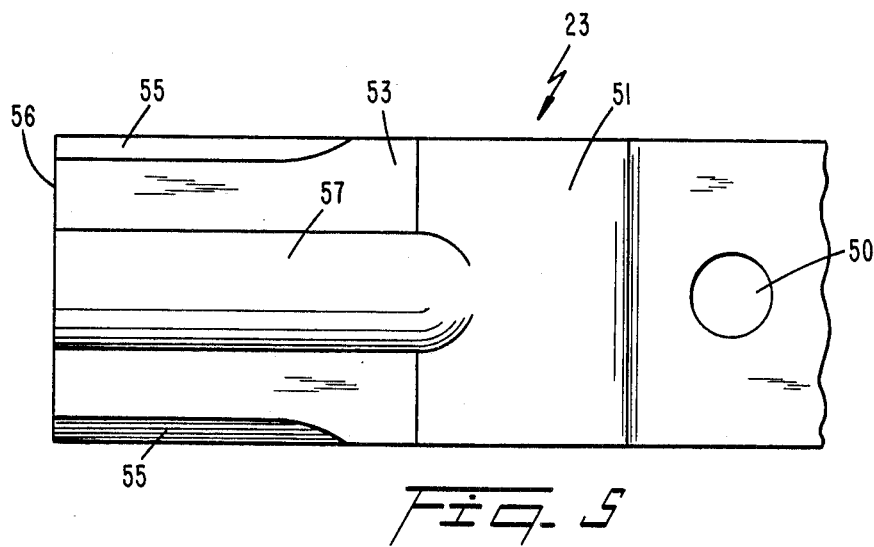

EDGER AND BLADE THEREFOR

FIELD OF THE INVENTION

The present invention relates generally to edgers of the type used to cut a furrow between a sidewalk edge and adjacent soil and more particularly to such an edger having a blade including oppositely extending arms having an outer planar portion and an inclined intermediate portion. In accordance with one aspect of the invention, the outer blade portions include a central longitudinal extending channel for lifting and turning soil cut from a furrow. In accordance with another aspect of the invention, a blade having arms with the outer planar and intermediate inclined portions is crossed with respect to a second soil cutting blade.

BACKGROUND OF THE INVENTION

Edgers of the type used to cut a furrow between a sidewalk edge and adjacent soil are very well known and extensively used. Such edgers typically include an electric or a gas powered motor that drives a horizontally extending shaft having a single solid cutting blade fixedly mounted thereon. The blade is typically configured as a planar element having a pair of oppositely extending arms, at the edges of which are beveled soil cutting surfaces. Such devices typically cut a relatively narrow furrow between the sidewalk edge and adjacent soil, wherein the furrow has a width approximately equal to the width of the blade. Because of the narrow width of the furrow, soil quickly accumulates in the furrow and it is necessary to cut the furrow on a relatively frequent basis. If soil does not accumulate in the furrow, grass quickly grows over the furrow so that the desired "edged" appearance is lost.

With commercially available, small motors, the width of the furrow cannot be increased merely by increasing the blade thickness. A sufficiently wide blade would impose too great a load on typical small motors used to drive edger blades. In addition, removal of soil from a relatively wide furrow cut by a wide blade poses difficult problems.

It is, accordingly, an object of the present invention to provide a new and improved blade configuration for an edger of the type used to cut a furrow between a sidewalk and adjacent soil.

Another object of the invention is to provide a new and improved edger of the type used to cut a furrow between a sidewalk and adjacent soil wherein the furrow is sufficiently wide, for example, on the order of one inch, to obviate the need for very frequent re-edging.

A further object of the invention is to provide a new and improved blade configuration for existing edgers, wherein the blade configuration enables a relatively wide furrow to be cut between the edge of a sidewalk and adjacent soil.

Still another object of the invention is to provide a new and improved blade that is easily added to existing, previously sold edgers of the type used for cutting a furrow between a sidewalk edge and adjacent soil, wherein the added blade enables a relatively wide furrow to be cut.

SUMMARY OF THE INVENTION

In accordance with one aspect of the present invention, there is provided a new and improved blade adapted to be inserted on a horizontally extending rotating shaft of an edger of the type used to cut a furrow between a sidewalk edge and adjacent soil. The blade comprises plural elongated arms, each having a longitudinal axis extending radially from a central portion having an aperture for receiving the shaft so that when the blade is on the shaft, the arms extend in a vertical plane. Each of the arms includes an outer planar portion and an inclined intermediate portion having opposite ends respectively connected to the central portion and to the outer planar portion to mount the outer portion in a plane substantially parallel to and removed from a plane containing the aperture and at right angles to the shaft axis. Each outer planar portion has a longitudinal edge including a beveled longitudinal soil cutting surface for forming the furrow. Each outer planar portion also includes a central longitudinally extending channel that provides strength to the blade and which lifts and turns the soil cut from the furrow by the beveled cutting surface, in a manner similar to the soil lifting and turning action of a mold board of a mold board plow.

In accordance with a further aspect of the invention, an edger of the type used to cut a furrow between a sidewalk edge and adjacent soil comprises a horizontally extending motor driven shaft. A first blade is fixedly mounted on the shaft and includes a pair of elongated soil cutting arms extending oppositely from a central portion that is fixedly mounted on the shaft. The arms and central portion of the first blade are substantially coplanar, whereby the first blade is typically of the type used on present, commercially available edgers. A second blade in accordance with the invention is fixedly mounted on the shaft. The second blade has a central portion fixedly mounted on the shaft and a pair of elongated arms crossed with respect to the arms of the first blade. Each arm of the second blade has a longitudinal axis extending radially from the second blade central portion. Each of the arms of the second blade includes an outer planar portion and an inclined intermediate portion having opposite ends respectively connected to the central portion and the outer planar portion of the second blade, so that the outer portion is mounted on the intermediate portion in a plane substantially parallel to and removed from a plane containing an aperture in the central portion for receiving the shaft and at right angles to the shaft axis. Each outer planar portion has a longitudinal edge including a beveled longitudinal soil cutting surface for forming the furrow. The first and second blades are mounted on the shaft so that the planes of the first blade and of the outer portion of the second blade are spaced to form a gap that approximately defines the width of the furrow formed by the edger.

Preferably such an edger is arranged so that each of the outer portions of the second blade includes a longitudinally extending channel for lifting and turning soil cut from the furrow by the blade as the shaft turns. By providing a pair of crossed blades, rather than a pair of spaced cutting disks, as disclosed in FIGS. 21 and 22 of Smith et al, U.S. Pat. No. 2,913,058, the load on the edger motor of the present invention is reduced considerably.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 3 is a side view, taken through the line 3—3 of FIG. 2, of a blade configuration in accordance with the present invention;

FIG. 4 is a side view, taken through the line 4—4 of FIG. 2, wherein the blade configuration is illustrated at right angles to the plane configuration illustrated in FIG. 3; and FIG. 5 is a top view of a blade in accordance with a preferred embodiment of one aspect of the present invention.

DETAILED DESCRIPTION OF THE INVENTION

Figure 1:
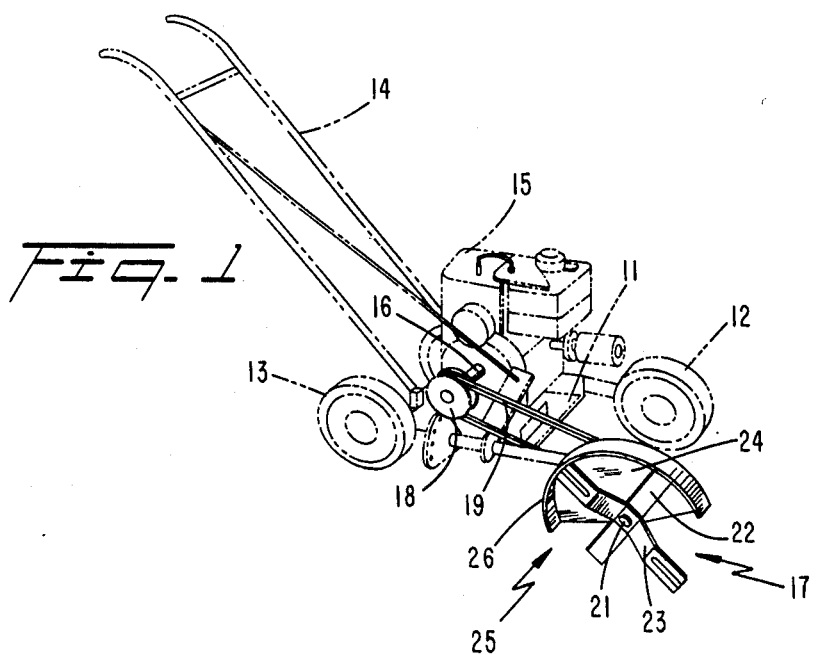
FIG. 1 is a perspective view of an edger of the type adapted to be used with the present invention.

Reference is now made to FIG. 1 of the drawing wherein an edger of the type that is used to cut a furrow between a sidewalk edge and adjacent soil is illustrated as including a generally horizontally disposed base plate 11 on which are mounted wheels 12 and 13, handle 14 and engine 15, which can be of the electric or gasoline operated type. Engine 15 includes a drive shaft 16 that drives blade assembly 17 by way of pulley wheel 18, belt 19 and a further pulley wheel (not shown), to which horizontally disposed shaft 21 is connected. On shaft 21 are fixedly mounted crossed soil cutting blades 22 and 23, which are disposed in parallel vertically extending planes when the edger is in use. Blade 22 is mounted so that it is inboard of blade 23 relative to shaft 21. Shaft 21 extends through a vertically extending plate 24 of shield 25, having arcuate flange 26 which is disposed at right angles to plate 24. Shield 25 is fixedly mounted on base plate 11. The edger illustrated in FIG. 1 is conventional, except for the inclusion of blade 23 and the relationship of blade 23 to blade 22. As such, the edger of FIG. 1 can be modified to easily accept blade 23, either by factory inclusion of blade 23 or by an owner/user of the edger purchasing the blade as a retrofited item.

Figure 2:
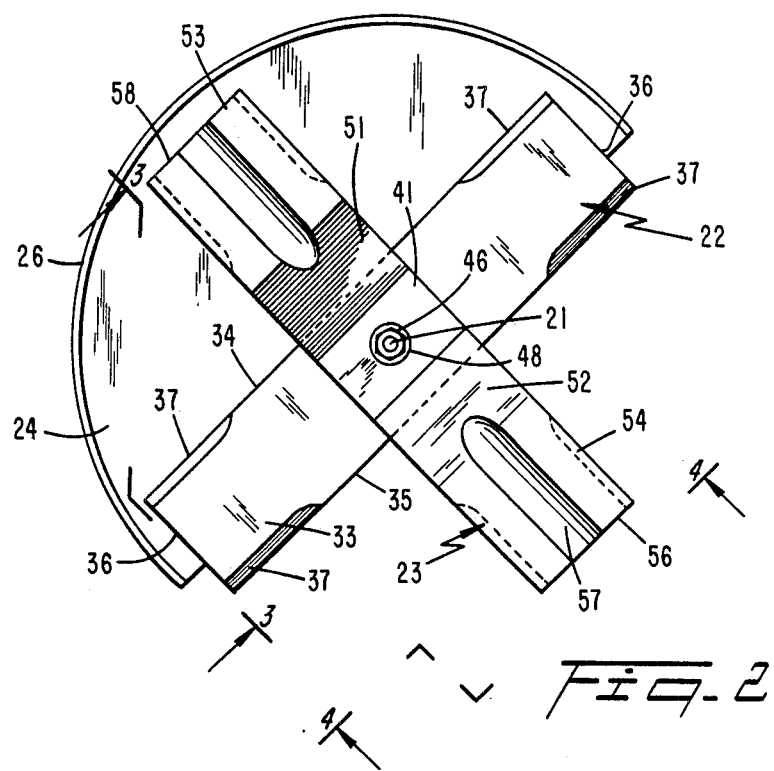
FIG. 2 is an enlarged, elevation view of the blade configuration employed on the edger illustrated in FIG. 1.

As illustrated in greater detail in FIGS. 2-4, conventional blade 22 includes a central portion 31 having an aperture (not shown) through which shaft 21 extends. Extending radially from central portion 31 of blade 22 are opposed elongated arms 32 and 33 which are coplanar with central portion 31. At the ends of the longitudinal edges 34 of arms 32 and 33, i.e., the ends of arms 32 and 33 adjacent transverse edges 36 of outer blade portions 32 and 33, are beveled soil cutting surfaces 37. Surfaces 37 are beveled so that the inclined portions thereof face towards blade 23, rather than inwardly toward shield 25, as illustrated in Figures 2 and 3.

As illustrated in FIGS. 2-5, blade 23 is configured to have a central, planar portion 41 having an aperture through which shaft 21 extends. Blade 23 is cast as an integral steel member having a thickness on the order of 3/16". Central portion 41 of blade 23 includes an inboard face 42 which abuts against outboard face 43 of central portion 31 of blade 22. Faces 42 and 43 are maintained in contact with each other and the blades are held in situ on shaft 21, preferably by nut and washer assembly 44 including nuts 45 and 46 which bear against washers 47 and 48, respectively. Nuts 45 and 46 are threaded onto threads 49 at the end of shaft 21. Washers 47 and 48 bear against the faces of inner blade portions 31 and 41.

Extending from central portion 41 of blade 23 are inclined, radially extending planar, intermediate portions 51 and 52. Radially extending from the ends of intermediate portions 51 and 52 are substantially planar outer blade portions 53 and 54, respectively. Outer blade portions 53 and 54 are coplanar and are in a vertical plane which is removed from the plane of outer blade portions 32 and 33 of inboard blade 22. Typically, the spacing between the planes of the outer blade portions of blades 22 and 23 is approximately one inch, such that a one inch wide furrow is cut by blades 22 and 23 when they turn about axis 21.

The longitudinal edges of outer blade portions 53 and 54 include beveled soil cutting edges 55. Surfaces 55 extend along outer blade portions 53 and 54 to transverse edges 56 at the ends of portions 53 and 54 remote from intermediate blade portions 51 and 52. Soil cutting surfaces 55 are formed on the edges of blade 23 such that the beveled surfaces 55 face inboard, toward blade 22. Thus, beveled soil cutting surfaces 37 and 55 face each other.

Extending longitudinally, i.e., radially, along the center line of outer blade portions 53 and 54 are channels or ribs 57. Channels or ribs 57 extend from inclined intermediate blade portions 51 and 52 to the outer, peripheral edges 56 of blade portions 53 and 54. Channels or ribs 57 form grooves in the outboard face of outer blade portions 53 and 54. Thereby, the channels or ribs 57 extend from the plane of outer planar portions 53 and 54 toward blade 22. Channels or ribs 57 provide strength to blade 23; in addition ribs 57 turn and lift soil from the furrow cut by beveled surfaces 37 and 55, in a manner similar to that in which a mold board turns and lifts soil from a furrow cut by a mold board plow.

In operation, with engine 15 driving blade assembly 17 through shaft 21, the engine is placed such that blade 22 abuts against a vertical edge of a sidewalk which is to be edged. As blade assembly 17 rotates, beveled edges 37 and 55 cut a furrow, typically having a width of approximately one inch, from soil adjacent the sidewalk vertical edge. The cut soil is removed from the furrow by the hump like inboard surface of channel 57 that faces toward blade 22. As the portion of blade 23 in the furrow turns from the vertical toward the horizontal, i.e., turns upwardly, the hump like surface on the inboard side of channel 57 turns and lifts the cut soil in the furrow out of the furrow. Because of the crossed, preferably 90 degree, relationship between the longitudinal, radially extending axes of blades 22 and 23, the soil turned and lifted out of the furrow by channel 57 is free to be disbursed away from the furrow, typically toward the sidewalk on the inboard side of blade 22. This facilitates removal of soil cut from the furrow, without causing an accumulation of soil or turf adjacent the sidewalk. Because of the relatively wide furrow cut with an edger and a blade in accordance with the present invention, the frequency of edging is considerably reduced.

Typically, blade 23 has a standard length of approximately nine inches and a central aperture 50 having a diameter of 17/32", so that the blade can be accommodated by a standard half inch edger drive shaft. It is to be understood, however, that if necessary other configurations and sizes of blade 23 and shaft 21 can be provided.

While there has been described and illustrated one specific embodiment of the invention, it will be clear that variations in the details of the embodiments specifically illustrated and described may be made without departing from the true spirit and scope of the invention as defined in the appended claims.

What is claimed is:

1. An edger of the type used to cut a furrow between a sidewalk edge and adjacent soil comprising a horizontally extending motor driven shaft, a first blade fixedly mounted on said shaft, the first blade including a pair of elongated soil cutting arms extending oppositely from a central portion fixedly mounted on said shaft, the arms and central portion being substantially coplanar; a second blade fixedly mounted on said shaft, the second blade having a central portion fixedly mounted on said shaft and a pair of elongated arms crossed with respect to the arms of the first blade, each arm of the second blade having a longitudinal axis extending radially from the second blade central portion, each of said arms of the second blade including an outer planar portion and an inclined intermediate portion having opposite ends respectively connected to the central portion and to the outer planar portion to mount the outer portion in a plane substantially parallel to and removed from a plane containing the second blade central portion and at right angles to the shaft axis, each outer planar portion having a longitudinal edge including a beveled longitudinal soil cutting surface for forming the furrow and a central longitudinally extending channel for lifting and turning soil cut from the furrow by the soil cutting arms and the beveled cutting surfaces as the shaft turns; the first and second blades being mounted on said shaft so that the planes of the first blade and of the outer portion of the second blade are spaced to form a gap that approximately defines the width of the furrow formed by the edger, the channels being formed as a groove having a solid portion that extends transversely of the plane of the outer planar portion toward the first blade.

2. The edger of claim 1 wherein the beveled cutting surfaces of the second blade extends along a longitudinal edge of the outer planar portion thereof so that the beveled cutting surface faces the first blade.

3. The edger of claim 2 wherein the channel extends to a transverse edge of the outer planar portion remote from the inclined portion and transverse to the longitudinal axis of the arms of the second blade.

4. The edger of claim 3 wherein the cutting surface of the second blade is beveled to the transverse edge of the outer planar portion remote from the inclined portion.

5. The edger of claim 1 wherein the central portions of the first and second blades abut against each other.

6. The edger of claim 5 wherein the second blade is mounted on the shaft outboard of the first blade.

7. An edger of the type used to cut a furrow between a sidewalk edge and adjacent soil comprising a horizontally extending motor driven shaft, a first blade fixedly mounted on said shaft, the first blade including a pair of elongated soil cutting arms extending oppositely from a central portion fixedly mounted on said shaft, a second blade fixedly mounted on said shaft, the second blade having a central portion fixedly mounted on said shaft and a pair of elongated arms crossed with respect to the arms of the first blade, each arm of the second blade having a longitudinal axis extending radially from the second blade central portion, each of said arms of the second blade including an outer planar portion, means for mounting the outer portion in a plane substantially parallel to and removed from a plane containing the first blade cutting arms and at right angles to the shaft axis, each outer planar portion having a longitudinal edge including a beveled longitudinal soil cutting surface for forming the furrow and a central longitudinally extending channel for lifting and turning soil cut from the furrow by the soil cutting arms and the beveled cutting surfaces as the shaft turns; the first and second blades being mounted on said shaft so that the planes of the first blade and of the outer portion of the second blade are spaced to form a gap that approximately defines the width of the furrow formed by the edger, the channels being formed as a groove having a solid portion that extends transversely of the plane of the outer planar portion toward the first blade.

8. The edger of claim 7 wherein the beveled cutting surfaces of the second blade extend along a longitudinal edge of the outer planar portion thereof so that the beveled cutting surface faces the first blade.

9. The edger of claim 8 wherein the channel extends to a transverse edge of the outer planar portion remote from the inclined portion and transverse to the longitudinal axis of the arms of the second blade.

10. The edger of claim 9 wherein the cutting surface of the second blade is beveled to the transverse edge of the outer planar portion remote from the inclined portion.

* * * * *